Patented Oct. 26, 1937

2,096,885

UNITED STATES PATENT OFFICE 2,096,885

INSECTICIDE

Theodore R. Donlan, Irvington, N. J., assignor to Stanco Inc.

No Drawing. Application October 21, 1933, Serial No. 694,619

4 Claims. (Cl. 167—43)

This invention relates to the production of improved insecticides, particularly insecticides containing mineral oils which are in themselves toxic.

The invention also relates to the production of mineral oils which are adapted to be used as solvents for the toxic extracts of pyrethrum, derris, cube, tuba, haiari, and other plants that contain toxic ingredients.

The mineral oils used in preparing insecticidal sprays are usually highly treated and deodorized, boiling between the range of 300° F. and 600° F. The intensive treatment removes all compounds such as aromatics, olefines, etc., leaving only those of paraffinic and naphthenic nature.

In accordance with this invention, these mineral oils are further treated with solvents having a preferential solvent action for the naphthenic hydrocarbons. The resulting mineral oils, composed predominantly of paraffinic hydrocarbons, are inherently more toxic. The toxicity of the oil may be further increased by the addition of the toxic extracts of pyrethrum, derris, etc.

The solvents found suitable for removing the naphthenic hydrocarbons are phenyl acetate, methyl thiocyanate, furfuryl alcohol, benzonitrile, benzaldehyde, ethylene glycol monoethyl ether, ethylene glycol monoethyl ether acetate, ethylene glycol monomethyl ether, diethylene glycol monobutyl ether, propionaldehyde, nitrobenzene, etc.

Other mineral oil fractions may also be used in preparing insecticidal mineral oils, for example, various distillates as obtained by fractionating a mineral oil, refined products such as mineral white oils, solar red, etc., and hydrogenated mineral oils. These mineral oils, especially those that are to be used in plant sprays, may, if desired, first be subjected to a preliminary treatment with sulfuric acid to remove aromatics and other phytocidal ingredients and then with a preferential solvent to separate the naphthenic hydrocarbons. The resulting oil, either alone or in combination with other insecticides, may be emulsified with water by use of a suitable emulsifying, spreading or wetting agent, for example, mineral oil sulfonic compounds, especially oil-soluble sulfonates, casein, triethanolamine oleates, etc., and used in emulsion form for spraying plants.

The mineral oils so treated are very toxic to all forms of insect life and harmless to animal or vegetable life. As with all horticultural oil sprays, where the more volatile fractions are used, care must be taken with plants in leaf not to apply so much of the spray as to cause a burning effect. In spraying plants, it is known in the horticultural art what quantities of oil and what types of oil (as to boiling points and viscosities) are most desirable. The emulsions containing the mineral oils so treated are also effective when used in sheep dips and in spraying animals.

The specific embodiments of the invention described are subject to various changes and it is intended to claim all novelty inherent in the invention as far as the prior art permits.

I claim:

1. An insecticidal composition comprising as an active ingredient a substantial quantity of mineral oil of 300° F. to 600° F. boiling range consisting predominantly of paraffinic hydrocarbons segregated from the normally accompanying naphthenic hydrocarbons.

2. An insecticidal aqueous emulsion comprising as an active ingredient a substantial quantity of mineral oil of 300° F. to 600° F. boiling range consisting predominantly of paraffinic hydrocarbons segregated from the normally accompanying naphthenic hydrocarbons.

3. An insecticidal composition comprising as an active ingredient a substantial quantity of mineral oil of 300° F. to 600° F. boiling range consisting predominantly of paraffinic hydrocarbons segregated from the normally accompanying naphthenic hydrocarbons and added active insecticidal principles of vegetable origin.

4. An insecticidal composition according to claim 3, in which the active insecticidal principles of vegetable origin are of the group consisting of pyrethrum, cube, tuba and haiari.

THEODORE R. DONLAN.